United States Patent [19]
Bengala et al.

[11] Patent Number: 5,903,354
[45] Date of Patent: May 11, 1999

[54] PROCESS FOR MEASURING THE VOLUME OF AN OBJECT BY MEANS OF A LASER SCANNER AND APPARATUS CAPABLE OF PERFORMING SAID PROCESS

[75] Inventors: Moreno Bengala; Alessandro Golfarelli, both of Bologna, Italy

[73] Assignee: Datalogic S.p.A., Bologna, Italy

[21] Appl. No.: 09/000,649

[22] Filed: Dec. 30, 1997

[30] Foreign Application Priority Data

Dec. 31, 1996 [EP] European Pat. Off. .............. 96830667

[51] Int. Cl.⁶ .................................................. G01B 11/00
[52] U.S. Cl. ...................... 356/380; 250/559.21; 702/156
[58] Field of Search .................................. 356/379, 380; 250/559.21; 702/156

[56] References Cited

U.S. PATENT DOCUMENTS 5,412,420  5/1995  Ellis .
5,661,561  8/1997  Wurz et al. .............................. 356/380

FOREIGN PATENT DOCUMENTS

| 0600800 | 6/1994 | European Pat. Off. . |
| 0690287 | 1/1996 | European Pat. Off. . |
| 4240094 | 6/1994 | Germany . |
| 2189594 | 10/1987 | United Kingdom . |
| WO9216818 | 3/1992 | WIPO . |

Primary Examiner—F. L. Evans
Attorney, Agent, or Firm—Sughrue, Mion, Zinn, Macpeak & Seas, PLLC

[57] ABSTRACT

The process uses information from the scan sweeps of a laser scanner to obtain a stipulated area which approximates the top surface of the object, by successive samplings while the object is moved relative to the scanner. The volume is then obtained as the volume included between that surface and a bearing surface. The process accommodates the slope angles of the scan plane. The volume measurement may be taken at the same time as an optical code provided on the object is read.

20 Claims, 2 Drawing Sheets

PROCESS FOR MEASURING THE VOLUME OF AN OBJECT BY MEANS OF A LASER SCANNER AND APPARATUS CAPABLE OF PERFORMING SAID PROCESS

BACKGROUND OF THE INVENTION

This invention relates to a process for measuring the volume of an object by means of a laser scanner, and to an apparatus implementing the process.

A problem shared by many segments of industry and trade is that of assessing the volume of an object. In particular, the supply and shipment of goods demand that the volume of packages be measured in an automated fashion to provide an element of information which is valuable to the conduction of both the storehouse premises and the carrier means.

SUMMARY OF THE INVENTION

Storehouse premises and carriers generally handle objects according to their weight, and to one or more of their linear dimensions regarded as most significant. This handling style is, therefore, approximative and surely less than fully satisfactory.

Accordingly, a first aspect of the invention concerns a process for measuring the volume of an object with at least one laser scanner, which process comprises the steps of:

placing the object onto a bearing surface;

defining a feed direction for the object on the bearing surface;

defining a scan plane, intersecting the plane of the bearing surface along a scan base line which lies transverse to the feed direction, with a laser beam from a scanner that overlies the bearing surface being arranged to act in the scan plane;

defining a fixed Cartesian reference system having a longitudinal axis (y) along the feed direction, a transverse axis (x) orthogonal to the longitudinal axis (y), and a vertical axis (z) orthogonal to the plane of the bearing surface;

moving the object across the bearing surface, along the feed direction, relative to the scan plane until the scan plane will intersect the object;

effecting a scan sweep across the object in the scan plane by means of the scanner;

reckoning and storing a set of triads of coordinates (x, y, z) of n points of measurement of the object swept by the laser beam in the scan plane;

moving the object relative to the scan plane through a feed distance in the feed direction equal to a predetermined longitudinal resolution (L);

repeating the three last-mentioned steps for at least two successive samplings;

establishing a set of standard values (x") for the transverse coordinate separated by a value equal to a predetermined transverse resolution (T);

constructing, for each scan sweep, a set of equivalent triads (x", y", z") representing equivalent points, wherein the values of the transverse coordinate (x") are equal to the values of the standard set, and the values of the longitudinal coordinate (y") and the vertical coordinate (z") are respectively functions of the values of the reckoned longitudinal and vertical coordinates (y, z);

computing the volume included between the bearing surface (x-y) and the surface defined by those points which have equivalent coordinates (x", y", z").

The movement of the object across the bearing surface in the feed direction, with respect to the scan plane, should be understood as a relative movement. Thus, either a movement of the object relative to a fixed scan plane, or a movement of the scan plane relative to an object held stationary, or both; is contemplated.

This process provides a reasonably accurate assessment of the volume of an object. The measurement is an approximate one, as usual, for two basic reasons.

A first reason is that the volume considered would not be the true volume of the object, but rather that included between the top face of the object swept by the laser beam and its orthogonal projection onto the bearing surface. In practice, the assumption is that the underside of the object is planar and that the side faces unswept by the laser beam are square to the underside; therefore, any dimples present in such faces are taken to be solid. However, this approximation suits well normal practical requirements for volume measurement; in fact, the geometric volume of the object is of less concern than its overall hamper, and it is preferred if possible dimples are left out as indeed unaffecting hamper.

The second reason is that the measurement is arrived at by a reckoning procedure carried out on some, not all, of the spots on the object (the points of measurement). This approximation can be made as close as required by increasing the number of points of measurement and reducing L and T.

The construction of the equivalent triads can be effected in different ways.

In a first suitable embodiment, the set of equivalent triads (x", y", z") are constructed, at each sampling, by the steps of:

comparing the set of values of the transverse coordinates (x) of the reckoned points of measurement in that sampling to the set of standard values (x");

if, for a given value (x") in the standard set a neighboring point of measurement exists whose measured transverse coordinate value (x) lies much closer to that value in the standard set (x") than the transverse coordinate (x) values of the other points of measurement, constructing the equivalent triad (x", y"=y, z"=z) whose transverse coordinate is equal to the value (x") in the standard set associated with the measured values of the longitudinal (y) and vertical (z) coordinates of the neighboring point;

if no neighboring point of measurement exists for a given value (x") in the standard set, locating two nearby points (a, b) in whose triads ($x_a$, $y_a$, $z_a$; $x_b$, $y_b$, $z_b$) the value of the measured transverse coordinate ($x_a$; $x_b$) is the largest of the smaller values and the smallest of the larger values, with respect to that value in the standard set (x");

constructing the equivalent triad (x", y", z") whose transverse coordinate is equal to the value (x") in the standard set, longitudinal coordinate (y"=$[y_a+y_b]$/2) is the average between the longitudinal coordinate (y) values of the two nearby points, and vertical coordinate (z"=$[z_a+z_b]$/2 is the average between the vertical coordinate (z) values of the two nearby points.

In a second, preferred embodiment, the set of equivalent triads (x", y", z") are constructed, at each sampling, by the steps of:

locating, for a given value (x") in the standard set, two nearby points (a, b) in whose triads ($x_a$, $y_a$, $z_a$; $x_b$, $y_b$, $z_b$) the value of the measured transverse coordinate ($x_a$; $x_b$) lies closer to that value in the standard set (x") than the transverse coordinate (x) values of the other measured points;

constructing the equivalent triad (x", y", z") whose coordinates are obtained by having the vertical and longitudinal plane with a transverse coordinate equal to the value (x") in the standard set intersect a line joining the two nearby points.

Advantageously, a modified value (y') is used instead of the measured value of the longitudinal coordinate (y) which is a function of the measured value (y) and the feed distance (L).

The modified value can be obtained in different ways.

In a first, preferred embodiment, the modified value of the longitudinal coordinate is equal to the difference between the measured value (y) and the value ($y_{prec}$) that was measured at the previous sampling and found associated with the same value (x") in the standard set, plus the feed distance (L). Briefly, $y'=y-[y_{prec}+L]$.

In a second preferred embodiment, the modified value of the longitudinal coordinate is equal to the measured value (y) less a number of feed distances (L) equal to the number of samplings (m) performed. Briefly, $y'=y-mL$.

Preferably, the volume included between the bearing surface (x-y) and the surface defined by the points having equivalent coordinates (x", y", z") is computed by the following steps:

considering the grid formed on the plane of the bearing surface (x-y) by the trapezoids defined by the projected points of the points having equivalent coordinates (x", y", z")

computing the area of each trapezoid in the grid;

computing, for each trapezoid, a stipulated height as a function of the equivalent vertical coordinate (z") values associated with the four corners of the trapezoid;

computing an elementary volume by multiplying the area of one trapezoid by its stipulated height;

computing the volume included between the bearing surface (x-y) and the surface defined by the points having equivalent coordinates (x", y", z") as the combined sum of all the elementary volumes.

Preferably, the step of computing the area of each trapezoid comprises the following sub-steps:

computing the two parallel sides of the trapezoid as differences ($\Delta y$) between the equivalent longitudinal coordinates (y") of each pair of corners of the trapezoid that have the same equivalent transverse coordinate (x");

computing the sum of the parallel sides of each trapezoid;

multiplying this sum by T and then dividing by 2.

Preferably, the stipulated height associated with each trapezoid is the arithmetical average between the vertical coordinates (z") of the equivalent points (x", y", z") of which the corners of the trapezoid are projections onto the plane of the bearing surface (x-y).

The spatial positions of the measurement points can be found in different ways, using the scanner and processing unit. Preferably, they are reckoned by a first measurement in polar coordinates (centered on the origin of the virtual scan source, i.e. on the imaginary point whence the scan rays appear to issue and which may be within or outside the scanner and be fixed or movable, according to the optics used), and a subsequent conversion to Cartesian coordinates x, y, z. This embodiment is preferred because the measurement is obtained in coordinates which suit well the measuring instrument (the scanner movement is a polar type), while the result of the processing is expressed in coordinates which suit well the quantities to be measured and the calculations subsequently to be made therewith.

Preferably, the scan plane slope has an angle other than 90° to the plane of the bearing surface (x-y). In fact, the inventive process can operate correctly regardless of the slope of the scan plane to the plane of the bearing surface (x-y); however, the complexity of the computation would be unjustified if the scan plane lies perpendicularly, since in this case another process may be used which involves less burdensome computations, such as that disclosed in the co-pending patent application by the Applicant.

Suitably, the process further comprises a step of reading an optical code provided on the object, and the optical code is preferably read by means of the same scanner as is used for reckoning the spatial position of the measurement points. In this way, the volume information can be associated with other distinctive information contained in the optical code, such as the type of a product, its manufacturer, price, supplier, destination, etc.

A second aspect of the invention relates to an apparatus for measuring the volume of an object, comprising:

a bearing surface for the object, with an object feed direction being defined across the bearing surface;

a laser scanner overlying the bearing surface and arranged to act in a scan plane intersecting the plane of the bearing surface along a scan base line transverse to the feed direction;

a processing unit linked to the scanner;

a means of moving the object across the bearing surface relative to the scan plane along the feed direction;

a means of sending a signal to the processing unit each time that the object is moved through a predetermined feed distance, equal to a predetermined longitudinal resolution L, relative to the scan plane; wherein the scanner and/or processing unit is operative to:

scan the object in the scan plane by means of the scanner;

reckon and store a set of coordinate triads (x, y, z) of n points of measurement on the object, spotted by the laser beam in the scan plane;

reckon the movement of the object relative to the scan plane through a feed distance along the feed direction which is equal to a predetermined longitudinal resolution (L);

repeat the three last-mentioned steps until the whole object is sampled;

establish a set of standard values (x") for the transverse coordinate, at a spacing fron one another whose value is equal to a predetermined transverse resolution (T);

construct, at each scan sweep, a set of equivalent triads (x", y", z") wherein the values of the transverse coordinate (x") are equal to the values in the standard set, and the values of the longitudinal coordinate (y") and vertical coordinate (z') are respective functions of the values of the reckoned longitudinal and vertical coordinates (y, z);

computing the volume included between the bearing surface (x-y) and the surface defined by the points having equivalent coordinates (x", y", z").

This apparatus can implement the previously described process.

Preferably, the bearing surface is provided by a belt conveyor, and the means for driving the object across the bearing surface relative to the scan plane comprises a powered guide roller of the belt conveyor.

The means for sending a signal to the processing unit each time that the object has travelled the predetermined feed distance may consist of a simple clock signal, as long as the running speed of the belt conveyor is constant. Preferably, the means for sending a signal to the processing unit each time that the object has travelled a predetermined feed distance relative to the scan plane comprises an encoder active on a guide roller of the belt conveyor. In this way, proper operation can be ensured even where the speed of the belt conveyor is non-constant, for instance because the objects being measured have a large mass which slows down the movement.

Advantageously, this apparatus may also include a means of detecting the object on its entering a scan zone of the bearing surface located close to the scan plane, and/or a means of detecting the object on its exiting a scan zone of the bearing surface located close to the scan plane.

BRIEF DESCRIPTION OF THE DRAWINGS

Further features and advantages of the invention will be apparent from the following detailed description of some referred embodiments thereof, given with reference to the accompanying drawings. In the drawings.

Figure 1:
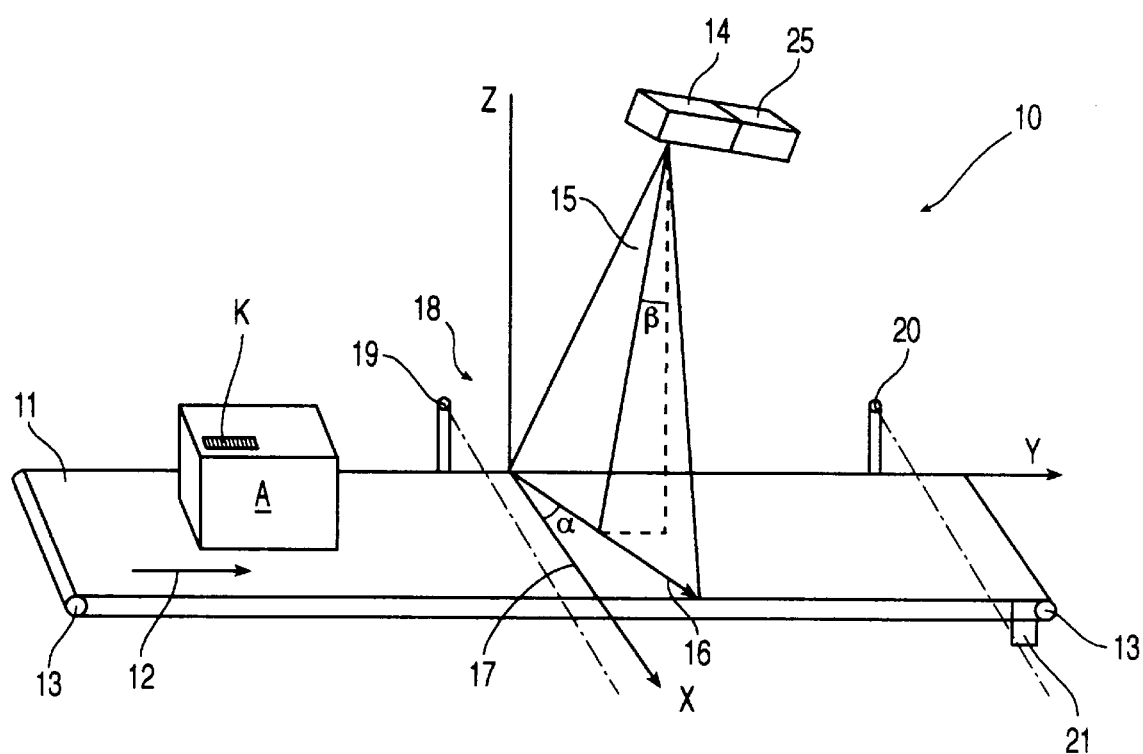
FIG. 1 is a perspective view showing schematically an apparatus according to the invention.

Shown in FIG. 1 is an apparatus 10 which comprises a bearing surface 11 for objects A to be measured for volume. The bearing surface 11 is substantially horizontal and consists preferably of a belt conveyor, also denoted by the numeral 11, which can be driven along a feed direction 12 and is guided by rollers 13, one of which is powered.

The apparatus 10 includes a modulated light laser scanner 14 capable of measuring a distance, e.g. a similar one to that described in U.S. Ser. No. 483,051 by this Applicant, it utilizing a laser beam which sweeps a scan plane 15 incident onto the plane of the bearing surface 11. Specifically, the scanner 14 is placed above the bearing surface 11; the scan plane 15 is set at an angle β from the perpendicular to the bearing surface 11 and intersects it along a scan base line 16; and the scan base line 16 is inclined at an angle a to a line 17 of the bearing surface 11 which lies perpendicularly to the feed direction 12.

The section of the bearing surface 11 next to the scan base line 16, and indicated as the scan zone 18, is bounded by an entry detector 19 and an exit detector 20, being both preferably comprised of photocells.

Figure 2:
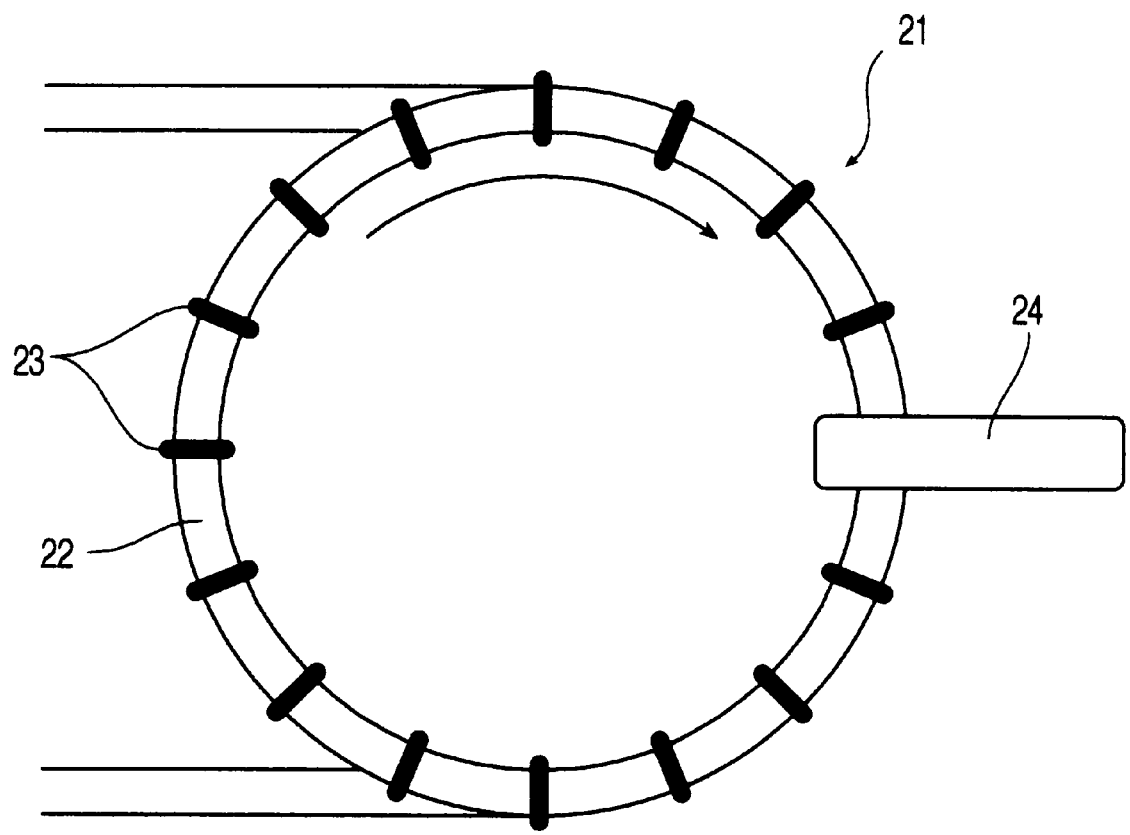
FIG. 2 is a schematic representation of an encoder incorporated to the apparatus of FIG. 1.

The bearing surface 11 is provided with an encoder 21, that is with a device adapted to issue a signal each time that the bearing surface 11 is moved exactly through a predetermined feed distance. The encoder 21 may be of any type, e.g. electro-optical as shown schematically in FIG. 2. One of the rollers 13 carries, rotatively fixed with it, a disk 22 marked with notches 23 at substantially tangential positions with respect to the plane of the bearing surface 11 which are formed at circumferential spacings equal to the feed distance sought; an electro-optical notch recognition device 24 is arranged to "see" the notches 23 moving past it and output a signal at each passing notch 23.

Also provided is a processing unit 25, which may be incorporated to the scanner 14, or separate and suitably connected to it.

The apparatus 10 operates as follows. Objects A to be measured for volume are placed onto the belt conveyor 11, at a spacing from one another. The continuous motion of the belt conveyor 11 will take each object A to the entry detector 19, and then to the scan zone 18. The object movement past the entry detector 19 triggers the delivery of a signal to the processing unit 25, whereby the unit will initiate the measuring procedure.

The encoder 21 also delivers a signal to the processing unit 25, during the movement Of the belt conveyor 11, each time that the belt conveyor, carrying the object A, travels a distance same as the predetermined feed distance. Each time that a signal is received from the encoder 21, a sampling operation is performed; the scanner 14, once enabled by the sensor 19, will in fact scan the object A continuously, but the processing unit 25 only store the n values of the corresponding scan sweep to the encoder signal. It should be noted that the infeed speed of the belt conveyor 11, albeit quite fast, is far slower than the sweep rate of the laser beam of the scanner 14, so that the distance moved by the object A relative to the scan plane 15 during the time taken by the scanner 14 for a full sweep across the scan plane 15 is quite trivial.

DETAILED DESCRIPTION OF THE INVENTION

Upon the object A reaching the scan base line 16, the laser beam of the scanner 14 will impinge on the object A. Under control by the processing unit 25, the scanner 14 will reckon the height of n points of measurement on the object A spotted by the laser beam.

To this aim, the scanner 14 reckons, for each point of measurement, both its distance from the scanner 14 (or rather, from the imaginary point whence the rays appear to issue) and the angular position of the laser beam, thereby obtaining the values in polar coordinates of the position of that point in the scan plane 15. These values are then processed by the unit 25 to obtain values therefrom which are representative of the position of the point in a system of Cartesian coordinates having a longitudinal y axis coincident with the feed direction, a transverse x axis directed along the line 17 (that is, such that the x-y plane will coincide with that of the bearing surface 11), and a vertical z axis directed upwards. For this conversion, the angle α (i.e., the slope of the scan line 16 with respect to the y axis), the angle β (i.e., the slope of the scan plane with respect to the perpendicular to the bearing surface 11), and the scanner 14 position must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

At each scan sweep, the reckoning is effected for a predetermined number, n, of points on the object A, being careful to span the whole bearing surface 11. Thus, a set of coordinate triads x, y, z are obtained which represent the outline of a cross-section through the object in the scan plane 15.

Thereafter, it is waited until the object A moves through a predetermined feed distance L; this is signalled by the encoder 21 controlling a fresh sampling. In this way, successive cross-sections of the object A are sampled, reckoning each time one set of coordinate triads x, y, z. All the sets of triads x, y, z are then stored into the processing unit 25.

This goes on as long as the object A locates in the scan zone 18. At a certain point, the exit detector 20 will signal that the object A has moved out of the scan zone 18; thereupon, the processing unit 25 will terminate the measuring procedure.

The reckoned triads x y z are then processed for a most convenient determination of volume.

First, a set of standard x" values is established, each spaced from the next by a value equal to a predetermined transverse resolution T. The value of T may be of 1 cm, for example; this value has proved suitable for volume measurements of packages intended for shipment which have overall hamper dimensions on the order of a few decimeters.

Next, the triads x, y, z are normalized to the x" set.

In a first embodiment, for each reckoned triad set that are stored during one sampling, the x values are compared to the x" values, to check if a triad, referred to as the neighboring triad, exists for each x" value whose x value lies much closer to the x" value than the x values of the other triads. A first value $x_a$ is considered to lie much closer to a second value $x_b$, at a value $x"_1$, if the distance of the second value is at least twice as great as that of the first, i.e. if $x_b-x"_1>2(x_a-x"_1)$.

In the affirmative, that is if a neighboring triad is there, an equivalent triad x", y"=y, z"=z (representing an equivalent point) is then constructed from that triad x, y, z which is obtained from the neighboring triad by substituting the normalized x" value for the reckoned x value.

In the negative, two points are then considered, referred to as nearby points herein, whose triads $x_a$, $y_a$, $z_a$ and $x_b$, $y_b$, $z_b$ have the values $x_a$ and $x_b$ immediately below and above x", that is the largest of the smaller (or equal) values than (to) x", and the smallest of the larger (or equal) values than (to) x"; then, the two arithmetic means between $y_a$ and $y_b$ and between $z_a$ and $z_b$ are taken. Finally, the equivalent triad x", y", z" are constructed where y" and z" are said two arithmetic means.

Alternatively, the equivalent points and their equivalent triads x", y", z" may be obtained as follows. Instead of checking for the existence of a neighboring point, again two nearby points are taken which can be either spotted as indicated above, that is as the points whose triads $X_a$, $y_a$, $z_a$ and $x_b$, $y_b$, $z_b$ have the values $x_a$ and $x_b$ immediately below and above the specific x" value, or as the points whose triads $x_a$, $y_a$, $z_a$ and $x_b$, $y_b$, $z_b$ have the closest values $x_a$ and $x_b$ to x". Notice that these two determination processs are not necessarily coincident, especially where the number of reckoned points x, y, z is much higher than the number of standard x" values; with the second process, in fact, both nearby points may happen to have a transverse x coordinate which is larger or smaller than the x" value.

Once the two nearby points are determined in either ways, the equivalent point is determined by interpolation as the intersect of a line joining the two nearby points, with the vertical plane having a transverse coordinate equal to the specific x" value. In other words, the longitudinal and vertical coordinates of the object are re-constructed at the vertical planes whose transverse x" coordinates are equal to the values of the standard set, using the longitudinal and vertical coordinates as actually measured at different transverse x coordinates.

This second embodiment looks more accurate than the previous one, since in determining the coordinates of the equivalent points, different weights are automatically given to the data used according to the distance of the points actually measured with respect to the equivalent points.

All of the foregoing is repeated, in accordance with the selected one of the above embodiments, for each triad of each sampling, thereby obtaining a set of equivalent triads x", y", z" at each sampling.

The triads x", y", z" thus obtained cannot be used yet for directly measuring the volume of the object A, due to the slope β and to the shape of the object A possibly being an undefined one. For example, by multiplying the area of each scanned cross-section (to be computed by the known triad set of that scan sweep) by the feed distance, and adding together all the elementary volumes thus obtained, some significant errors may be incurred especially with tall and short objects; in fact, one vertical front face would be scanned at different heights with several successive sweeps to produce a number of cross-sections having increasing heights instead of one cross-section of appropriate height. In practice, an error would be introduced by that the movement of the scanned points along the y axis has not been taken into account.

Accordingly, in place of each y coordinate, a modified y' coordinate is used which has been obtained by taking into account the feed movement of the object A.

According to a first possibility, the modified y' coordinate is obtained as the difference between the y coordinate of a sampling point and the y coordinate of the corresponding point (i.e., the point that has been found associated with the same x" value) in the previous scan sweep, plus the feed distance L; briefly, $y'=y-[y_{prec}+L]$.

According to another possibility, the modified y' coordinate is obtained as the measured value y minus a number of feed distances L equal to the number m of samplings performed up to that time. Briefly, y'=y−mL.

Notice that triads x, y', z modified with the y' values obtained as just described provide a faithful representation of the true outline of the object, since account has been taken of the movements along the y axis, and could be used to compute the volume directly without going through the equivalent triads. However, a computation of volume based directly on such modified triads would be very complicated and would require expensive high capacity computer means quite unsuitable for general applications. Thus, an approximate computation is resorted to as indicated.

The equivalent triads x", y", z" define (with spot approximation) a surface overlying the bearing surface x-y. The volume included between that surface and the bearing surface x-y gives a reasonably approximated value of the volume of the object A.

This volume can be computed in any of several ways, also more or less approximate, and hence by more or less complex computation. Described here below is a computation process which is specially convenient in that it provides a reasonably close approximation with fairly simple calculations.

Starting from the equivalent triads x", y", z", viewed as points on the aforesaid surface, the projections of such points onto the bearing surface x-y are considered; in practice, the points whose coordinates x", y", z'=0 are considered. These points define, in the plane x-y of the bearing surface, a grid formed of trapezoids with their parallel side pairs lying all parallel to one another (as mentioned, the values x" are the standard ones, the same for all the sets of triads derived from successive scan sweeps). Thus, the area of each trapezoid can be calculated and multiplied by a stipulated height of the trapezoid to obtain an elementary volume; the overall volume will, therefore, be the combined sum of the elementary volumes.

The area of each trapezoid is readily obtained as the product of the sum of the two parallel sides by the height separating them, divided by two; the two parallel sides can be obtained as the difference Δy of the y" coordinates of those points which have the same x" coordinate, the height between the parallel sides being the transverse resolution T.

The stipulated height of the elementary volume is preferably obtained as the average between the four values z" associated in the equivalent triads with the values x", y" of the trapezoid corners. To simplify the computation, one of the four values z" may be taken directly as the height of the elementary volume.

The start and end of the procedure for measuring the volume of an object, as just described, are governed by the movement of the object past the entry detector 19 and the exit detector 20. Alternatively, one or both detectors could be omitted. Their functions would then be served by the processing unit 25 using appropriate software to activate the measurement when a non-zero height z corresponds to a scan sweep, and stop it on the occurrence of a predetermined consecutive number of zero height scan sweeps; this number may be as low as 1, or at any rate be a small number.

Where the measuring procedure is started from software, the scanner 14 must be kept operating all the time, even if no measuring procedure is in progress, in order for the arrival of an object to be detected. On the other hand, the provision of an entry detector 19 allows the scanner 14 to be disabled when there are no objects to be measured, and accordingly, despite the added complexity it entails in the apparatus construction, it is preferred wherever a markedly discontinuous inflow of objects for measurement is anticipated. By contrast, the presence or absence of an exit detector 20 would not impair the ability to turn off the scanner 14 at the end of the measuring procedure. Therefore, the preference would usually go to the embodiment wherein the end of the measuring procedure is detected by software means.

Preferably, the apparatus 10 further includes a means of reading an optical code K (such as a bar code, a two-dimensional code, a color code, or the like) associated with the object A. A dedicated scanner could be provided or the scanner 14 itself used for the purpose.

The embodiment is specially advantageous wherein the apparatus 10 is used with just the scanner 14 mounted at an angle β from the vertical to the bearing surface 11; this inclination corresponds, in fact, to the preferred working position of a scanner for reading optical codes.

In the apparatus described hereinabove, the information about an object A provided by the scanning, i.e. the measurement of its volume and any information to be obtained by reading the optical code K, are preferably recorded in a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

In certain cases, a higher degree of accuracy may be needed in computing the volume of objects which are markedly irregular in shape, that is objects having bulging portions which cannot be neglected. In such cases, additional scanners may be arranged at one or both sides of the belt conveyor 11. Thus, a more accurate assessment of the volume can be obtained by measuring the distances of points on the side surfaces. It could also be arranged for the belt conveyor 11 to be transparent to laser light, and another laser to be placed under the belt; the bottom laser would then measure the distances of points on the underside of the objects to thereby provide a true measurement of volume.

What is claimed is:

1. A process for measuring the volume of an object with at least one laser scanner, which process comprises the steps of:

placing the object onto a bearing surface;

defining a feed direction for the object on the bearing surface;

defining a scan plane, intersecting the plane of the bearing surface along a scan base line which lies transverse to the feed direction, with a laser beam from a scanner that overlies the bearing surface being arranged to act in the scan plane;

defining a fixed Cartesian reference system having a longitudinal axis (y) along the feed direction, a transverse axis (x) orthogonal to the longitudinal axis (y), and a vertical axis (z) orthogonal to the plane of the bearing surface;

moving the object across the bearing surface, along the feed direction, relative to the scan plane until the scan plane will intersect the object;

effecting a scan sweep across the object in the scan plane by means of the scanner;

reckoning and storing a set of triads of coordinates (x, y, z) of n points of measurement of the object swept by the laser beam in the scan plane;

moving the object relative to the scan plane through a feed distance in the feed direction equal to a predetermined longitudinal resolution (L);

repeating the three last-mentioned steps for at least two successive samplings;

establishing a set of standard values (x") for the transverse coordinate separated by a value equal to a predetermined transverse resolution (T);

constructing, for each scan sweep, a set of equivalent triads (x", y", z") representing equivalent points, wherein the values of the transverse coordinate (x") are equal to the values of the standard set, and the values of the longitudinal coordinate (y") and the vertical coordinate (z") are respectively functions of the values of the reckoned longitudinal and vertical coordinates (y, z);

computing the volume included between the bearing surface (x-y) and the surface defined by those points which have equivalent coordinates (x", y", z").

2. A process according to claim 1, wherein the step of constructing the set of equivalent triads (x", y", z") comprises, at each sampling, the sub-steps of:

comparing the set of values of the transverse coordinates (x) of the reckoned points of measurement in that sampling to the set of standard values (x");

if, for a given value (x") in the standard set a neighboring point of measurement exists whose measured transverse coordinate value (x) lies much closer to said value in the standard set (x") than the transverse coordinate (x) values of the other points of measurement, constructing the equivalent triad (x", y"=y, z"=z) whose transverse coordinate is equal to the value (x") in the standard set associated with the measured values of the longitudinal (y) and vertical (z) coordinates of the neighboring point;

if no neighboring point of measurement exists for a given value (x") in the standard set, locating two nearby points (a, b) in whose triads ($x_a$, $y_a$, $z_a$; $x_b$, $y_b$, $z_b$) the value of the measured transverse coordinate ($x_a$; $x_b$) is the largest of the smaller values and the smallest of the larger values, with respect to said value in the standard set (x");

constructing the equivalent triad (x", y", z") whose transverse coordinate is equal to the value (x") in the standard set, longitudinal coordinate (y"=[$y_a$+$y_b$]/2) is the average between the longitudinal coordinate (y) values of the two nearby points., and vertical coordinate (z"=[$z_a$+$z_b$]/2) is the average between the vertical coordinate (z) values of the two nearby points.

3. A process according to claim 1, wherein the step of constructing the set of equivalent triads (x", y", z") comprises, at each sampling, the sub-steps of:

locating, for a given value (x") in the standard set, two nearby points (a, b) in whose triads ($x_a$, $y_a$, $z_a$; $x_b$, $y_b$, $z_b$) the value of the measured transverse coordinate ($x_a$; $x_b$) is the largest of the smaller values and the smallest of the larger values, with respect to said value of the standard set (x");

constructing the equivalent triad (x", y", z") whose coordinates are obtained by having the vertical and longitudinal plane with a transverse coordinate equal to the value (x") in the standard set intersect a line joining the two nearby points.

4. A process according to claim 1, wherein the step of constructing the set of equivalent triads (x", y", z") comprises, at each sampling, the sub-steps of:

locating, for a given value (x") in the standard set, two nearby points (a, b) in whose triads ($x_a$, $y_a$, $z_a$; $x_b$, $y_b$, $z_b$) the value of the measured transverse coordinate ($x_a$; $x_b$) lies closer to said value in the standard set (x") than the transverse coordinate (x) values of the other measured points;

constructing the equivalent triad (x", y", z") whose coordinates are obtained by having the vertical and longitudinal plane with a transverse coordinate equal to the value (x") in the standard set intersect a line joining the two nearby points.

5. A process according to claim 2, wherein a modified value (y'), being a function of the measured value (y) and the feed distance (L), is used in place of the measured value of the longitudinal coordinate (y).

6. A process according to claim 5, wherein the modified value of the longitudinal coordinate (y'=y−[$y_{prec}$+L]) is equal to the difference between the measured value (y) and the value ($y_{prec}$) that was measured at the previous sampling and found associated with the same value (x") in the standard set, plus the feed distance (L).

7. A process according to claim 5, wherein the modified value of the longitudinal coordinate (y'=y−mL) is equal to the measured value (y) less a number of feed distances (L) equal to the number (m) of samplings performed.

8. A process according to claim 1, wherein the step of computing the volume included between the bearing surface (x-y) and the surface defined by the points having equivalent coordinates (x", y", z") comprises the following steps:

considering a grid formed on the plane of the bearing surface (x-y) by trapezoids defined by the projected points of the points having equivalent coordinates (x", y", z");

computing the area of each trapezoid in the grid;

computing, for each trapezoid, a stipulated height as a function of the equivalent vertical coordinate (z") values associated with the four corners of the trapezoid;

computing an elementary volume by multiplying the area of one trapezoid by its stipulated height;

computing the volume included between the bearing surface (x-y) and the surface defined by the points having equivalent coordinates (x", y", z") as the combined sum of all the elementary volumes.

9. A process according to claim 8, wherein the step of computing the area of each trapezoid comprises the following sub-steps:

computing the two parallel sides of the trapezoid as differences (Δy) between the equivalent longitudinal coordinates (y") of each pair of corners of the trapezoid that have the same equivalent transverse coordinate (x");

computing the sum of the parallel sides of each trapezoid;

multiplying this sum by T and then dividing by 2.

10. A process according to claim 8, wherein the stipulated height associated with each trapezoid is the arithmetical average between the vertical coordinates (z") of the equivalent points (x", y", z") of which the corners of the trapezoid are projections onto the plane of the bearing surface (x-y).

11. A process according to claim 1, comprising the following steps:

measuring with the scanner the spatial position of each measurement point within a polar coordinate reference system centered on the origin of the scanner rays;

processing the polar coordinate values of the position of each point of measurement so as to determine the triads of Cartesian coordinates (x, y, z).

12. A process according to claim 1, wherein the scan plane lies at an angle other than a 90-degree angle to the plane of the bearing surface (x-y).

13. A process according to claim 1, including the step of reading an optical code provided on the object.

14. A process according to claim 13, wherein the optical code is read with the same scanner as is used for reckoning the spatial positions of the measurement points.

15. An apparatus for measuring the volume of an object, comprising:

a bearing surface for the object, with an object feed direction being defined across the bearing surface;

a laser scanner overlying the bearing surface and arranged to act in a scan plane intersecting the plane of the bearing surface along a scan base line transverse to the feed direction;

a processing unit linked to the scanner;

a means of moving the object across the bearing surface relative to the scan plane along the feed direction;

a means of sending a signal to the processing unit each time that the object is moved through a predetermined feed distance, equal to a predetermined longitudinal resolution (L), relative to the scan plane; wherein the scanner and/or processing unit is operative to:

scan the object in the scan plane by means of the scanner;

reckon and store a set of coordinate triads (x, y, z) of n points of measurement on the object, spotted by the laser beam in the scan plane;

reckon the movement of the object relative to the scan plane through a feed distance along the feed direction which is equal to a predetermined longitudinal resolution (L);

repeat the three last-mentioned steps until the whole object is sampled;

establish a set of standard values (x") for the transverse coordinate, at a spacing fron one another whose value is equal to a predetermined transverse resolution (T);

construct, at each scan sweep, a set of equivalent triads (x", y", z") wherein the values of the transverse coordinate (x") are equal to the values in the standard set, and the values of the longitudinal coordinate (y") and vertical coordinate (z") are respective functions of the values of the reckoned longitudinal and vertical coordinates (y, z);

computing the volume included between the bearing surface (x-y) and the surface defined by the points having equivalent coordinates (x", y", z").

16. An apparatus according to claim 15, wherein the bearing surface is provided by a belt conveyor, and the means for driving the object across the bearing surface relative to the scan plane comprises a powered guide roller of the belt conveyor.

17. An apparatus according to claim 16, wherein the means for sending a signal to the processing unit each time that the object has travelled a predetermined feed distance relative to the scan plane comprises an encoder active on a guide roller of the belt conveyor.

18. An apparatus according to claim 15, further comprising a means of detecting the object entering a scan zone of the bearing surface next to the scan plane.

19. An apparatus according to claim 15, further comprising a means of detecting the object exiting a scan zone of the bearing surface next to the scan plane.

20. An apparatus according to claim 15, wherein the scan plane of the laser scanner is set at an angle other than a 90-degree angle to the plane of the bearing surface.

* * * * *